United States Patent Office 3,328,263
Patented June 27, 1967

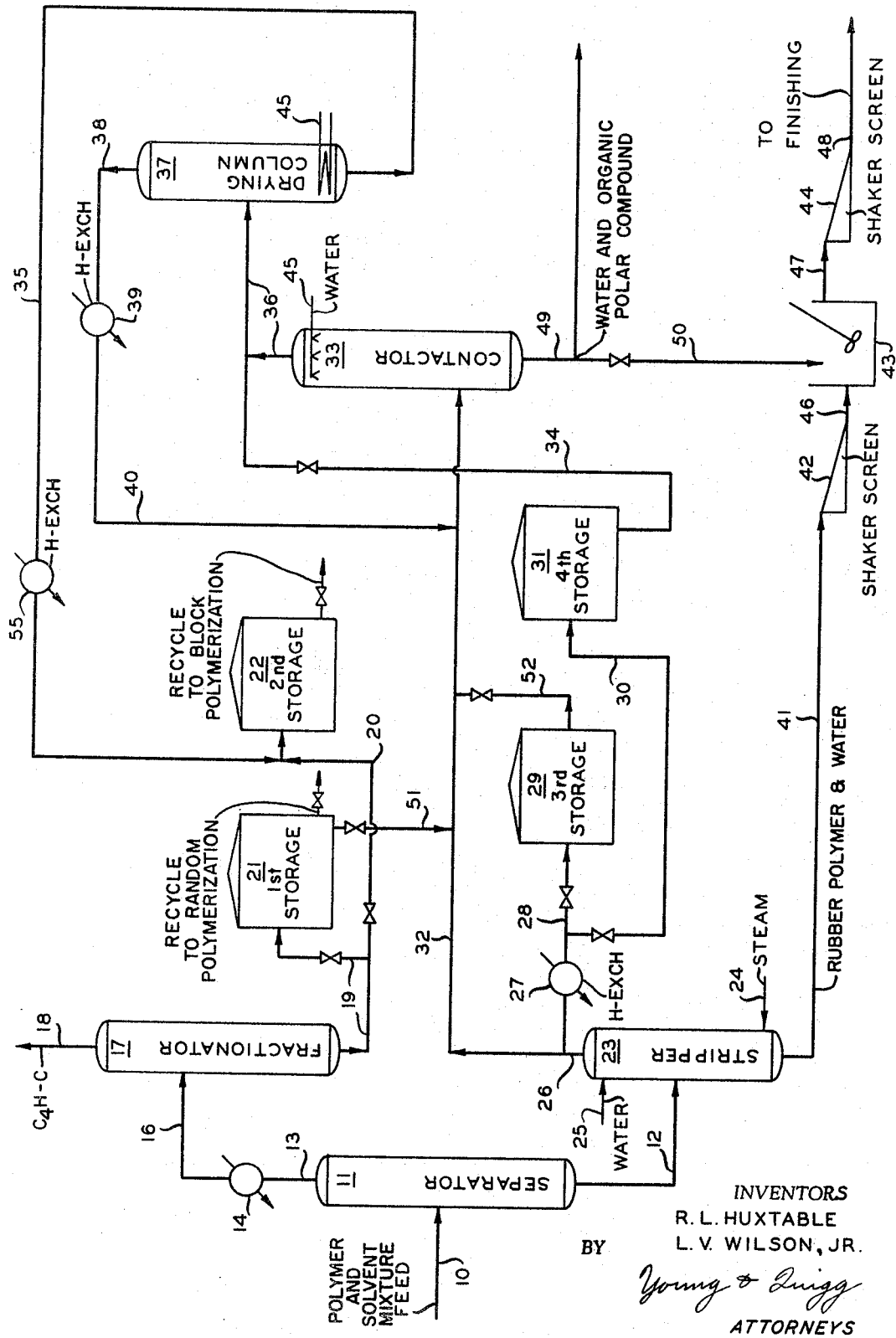

3,328,263
SOLVENT RECOVERY SYSTEM FOR RUBBER POLYMERIZATION PROCESSES
Robert L. Huxtable and Lawrence V. Wilson, Jr., Bartlesville, Okla., assignors to Phillips Petroleum Company, a corporation of Delaware
Filed Aug. 22, 1963, Ser. No. 303,803
5 Claims. (Cl. 202—154)

ABSTRACT OF THE DISCLOSURE

The effluent 10 from a polymerization zone (not shown) comprising polymer, solvent, a hydrocarbon reject fraction and at times a polar organic compound is phase separated as to vapor 13 and liquid 12 in separator 11, and each phase is further separated by fractionation in 17 and 23 respectively. The overhead from 17 is a vaporous hydrocarbon reject fraction, and the bottoms liquid 19 contains the solvent which is stored in first storage tank 21 when it contains a polar organic compound, and stored in second tank 22 when it is free of said polar organic compound. The bottoms liquid from 23 contains the polymer product, and the overhead vapors contains the solvent which is stored in third tank 29 when it contains said polar organic compound, and stored in fourth tank 31 when it is free of said polar organic compound. Because of this segregation of solvent containing the polar organic compound the system of this invention can be used without change for both random copolymer processes and block copolymer processes, whereas if not so segregated the polar organic compound would be detrimental on recycle to a block polymerization process, or would have to be added to a random copolymerization process.

---

This invention relates to a solvent recovery system for rubber polymerization processes. In another aspect, this invention relates to a single solvent recovery system for both a random copolymer process and a block polymer process.

It is desirable that different rubber polymers be produced in a single polymerization process system. For example, it may be desirable to produce a random copolymer utilizing the rubber polymerization process system and at a subsequent time utilize the same rubber polymerization process system to produce a block polymer. In the production of a random copolymer, an additive consisting of a polar organic compound is employed in the polymerization reaction zone. This polar organic compound is detrimental to a block polymer polymerization process. Therefore, provision must be made to remove this polar organic compound from the solvent employed in the random copolymer process before the solvent can be utilized in the block polymer process.

Block polymers are formed by polymerizing a monomer onto the end of a polymer, the monomer being introduced in such a manner that substantially all of the coreacting molecules enter the polymer chain at this point. The polymers prepared by a block polymerization process are distinguished from copolymers in that the final polymeric material is made up blocks or segments. A block polymer can be produced by a process which comprises contacting a conjugated diene selected from the group consisting of 1,3-butadiene, 2-methyl-1,3-butadiene and 1,3-pentadiene with an organolithium compound in the presence of a diluent or solvent selected from the group consisting of aromatic, paraffinic and cycloparaffinic hydrocarbons so as to form a polymer block, and, after polymerization of substantially all of the selective conjugated dienes, contacting the aforementioned catalyst in the presence of the polymer block initially formed with a monomer selected from the group consisting of 1,3-butadiene, 2-methyl-1,3-butadiene, 1,3-pentadiene, vinyl-substituted aromatic hydrocarbons, vinylpyridines, vinyl halides, vinylidine halides, acrylonitrile, esters of acrylic acid, and esters of homologs of acrylic acid so as to form a polymer block adjacent the first-mentioned polymer block, the monomer selected being different from the conjugated dienes employed in the initial contacting.

Random copolymers can be produced by a process which comprises contacting at least two members selected from the group consisting of 1,3-butadiene, 2-methyl-1,3-butadiene (isoprene), 1,3-pentadiene (piperylene), vinyl-substituted aromatic hydrocarbons, vinyl halides, vinylidine halides, esters of acrylic acid and esters and homologs of acrylic acid with an organolithium compound in the presence of a solvent mixture comprising (1) a hydrocarbon selected from the group consisting of aromatic hydrocarbons, paraffins, and cycloparaffins, and (2) a polar organic compound. In general, the polar organic compound utilized in the solvent mixture is one which does not inactivate the organolithium compound. Examples of polar organic compounds which do not inactivate the organolithium catalyst and which can, therefore, be used as a second component of the solvent mixture are ethers, thioethers (sulfides) and tertiary amines. Specific examples of such polar organic materials include dimethylether, diethylether, ethylmethylether, ethylpropylether, di-n-propylether, di-n-octylether, dibenzylether, diphenylether, tetramethylene oxide (tetrahydrofuran), 1,2-dimethyloxyethane, dioxane, paraldehyde, dimethyl sulfide, diethyl sulfide, di-n-propyl sulfide, di-n-butyl sulfide, methylethyl sulfide, dimethylethyl amine, tri-n-propyl amine, tri-n-butyl amine, trimethyl amine, triethyl amine, and the like.

It is desirable that a single solvent recovery system be employed to separate the solvent from the rubber polymer product of the block polymer reaction zone and the random copolymer reaction zone.

Accordingly, an object of our invention is to provide a solvent recovery system for multiple rubber polymerization processes.

Another object of our invention is to provide a single solvent recovery system for block polymer and random copolymer processes.

Other objects, advantages and features of our invention will be readily apparent to those skilled in the art from the following description, the drawing and appended claims.

The drawing is a schematic representation of the inventive solvent recovery system.

Referring to the drawing, the invention will be described as applied to a rubber polymerization zone effluent comprising polymer, solvent, a hydrocarbon reject fraction, and in the case of a random copolymer process, a polar organic compound passed to a separation vessel 11 via conduit means 10. The pressure of the effluent feed is reduced within separation vessel 11 so as to vaporize a portion of the solvent in the effluent feed to separation vessel 11. A vaporous stream comprising solvent, a $C_4$ reject fraction comprising butylenes, and in the case of a random polymer reaction, a polar organic compound, is withdrawn from separation vessel 11 via conduit means 13. The vaporous fraction is condensed via heat exchange means 14 and passed via conduit means 16 to a fractionation vessel 17.

Within fractionation vessel 17, the $C_4$ reject hydrocarbon fraction is separated from the feedstream and withdrawn from fractionation vessel 17 via conduit means 18. In the case of a random polymer production, the solvent containing the polar compound is passed via conduit means 19 to a storage vessel 21. In a block polymer process, the solvent free of polar organic compound is passed via conduit means 19 and 20 to storage vessel 22.

A liquid fraction comprising solvent and rubbery polymer, and in the case of a random copolymer process, a polar organic compound is withdrawn from separation vessel 11 via conduit means 12 and passed to a stripper vessel 23. Within stripper vessel 23, the feedstream is contacted with a stripping steam passed to stripper vessel 23 via conduit means 24. Water is passed to stripper vessel 23 via conduit means 25. Although only one stripper vessel is herein illustrated, it is within the scope of this invention to employ multiple stripping vessels. The temperature and pressure of stripper vessel 23 can be maintained in the range of about 150–225° F. and in the range of about 5–25 p.s.i.a., respectively, with the specific temperature and pressure employed dependent upon the specific diluent and the rubbery polymer present in the feedstream.

A vaporous stream comprising solvent and steam is withdrawn from stripper vessel 23 via conduit means 26. In a random copolymer process, polar organic compound will also be present in the vaporous stream withdrawn from stripper vessel 23. In one embodiment of the invention, the vaporous stream comprising steam and solvent is condensed via heat exchange means 27 and passed via conduit means 28 and 30 to storage vessel 31. The vaporous stream from a random copolymer process and comprising steam, solvent and polar organic compound is condensed via heat exchange means 27 and passed via conduit means 28 to storage vessel 29.

In a second embodiment, the vaporous stream comprising solvent, steam and polar organic compound withdrawn from the top of stripper vessel 23 via conduit means 26 is passed via conduit means 32 to a vertical contactor 33. Within contactor 33 the vaporous stream is contacted with water passed to contactor 33 via conduit and dispersing means 45. The vaporous feed is condsensed within contactor 33. This second embodiment of a solvent recovery process is applicable to the separation of polar organic compounds from solvents wherein the said polar organic compounds have a greater affinity for the water than for the hydrocarbon solvent. The water containing the polar organic compound in the feed to contactor 33 is withdrawn from contactor 33 via conduit means 49. Liquid solvent substantially free of polar organic compound is withdrawn from contactor 33 via conduit means 36 and passed to the upper region of a drying column 37.

The drying temperature within column 37 is maintained by a heat exchange means 45. A water-free solvent is withdrawn from drying column 37 via conduit means 35 and passed via conduit means 20 to storage vessel 22. A vaporous stream comprising water and any polar organic compound yet remaining in the feed to drying column 37 is withdrawn from drying column 37 via conduit means 38, condensed via heat exchange means 39, and recycled via conduit means 40 and 32 to contactor 33.

Solid rubbery polymer and water are withdrawn from stripper 23 via conduit means 41 and passed to a shaker screen 42 wherein the solid rubbery polymer is separated from the water. The polymer is passed via conduit means 46 to a vessel 43 wherein the solid polymer is contacted with cooling water. The rubbery polymer slurry is withdrawn from vessel 43 via conduit means 47 and passed to a second shaker screen 44 wherein the solid rubbery polymer is separated from the cooling water. Solid rubbery polymer is withdrawn from shaker screen 44 via conduit means 48 and passed to a finishing process not herein illustrated. It is within the scope of this invention to employ the water withdrawn from contactor 33 via conduit means 49 and 50 as cooling water within vessel 43.

In another embodiment of the invention, the solvent containing the polar organic compound within storage vessel 21 and the wet solvent containing polar organic compound within storage vessel 29 can be passed to contactor 33 wherein the polar organic compound is separated from the solvent. As illustrated, solvent containing polar organic compound is withdrawn from storage vessel 21 via conduit means 51, and passed via conduit means 32 to contactor 33. Wet solvent containing polar organic compound is withdrawn from storage vessel 29 via conduit means 52 and passed via conduit means 32 to contactor 33. Within contactor 33, the liquid feed is contacted with water. Water containing the polar organic compound is withdrawn from contactor 33 via conduit means 49 and polar organic compound-free solvent is withdrawn from contactor 33 via conduit means 36.

It is also within the scope of this invention to pass the wet solvent stored within storage vessel 31 via conduit means 34 and conduit means 36 to drying column 37 wherein the water is separated from the solvent and the solvent passed via conduit means 35 to dry solvent storage vessel 22.

We have thus provided a solvent recovery system capable of recovering solvent from both block polymer and random copolymer polymerization zone effluents, employing separate storage for the solvent and the solvent containing a polar organic compound. In addition, thereto, we have provided a solvent recovery process wherein polar organic compound is separated from the solvent and wherein water is removed from the solvent to provide a dry polar organic compound-free solvent. The polar organic compound-free solvent within storage vessel 22 can be recycled to the block polymer polymerization reaction zone. The solvent containing polar organic compound can be recycled from storage vessel 21 to the random copolymer polymerization reaction zone.

Reasonable variations and modifications are possible in view of the foregoing disclosure and discussion without departing from the spirit or scope thereof.

We claim:

1. Apparatus for separating solvent and solid polymers from a polymerization effluent produced in a rubber polymerization process comprising polymer solids, solvent, a hydrocarbon reject fraction, and at times a polar organic compound, comprising a separation vessel, first conduit means in communication with an intermediate region of said separation vessel for supplying said polymerization effluent thereto, a fractionation vessel, second conduit means communicating between an upper region of said separation vessel and an intermediate region of said fractionation vessel for feeding a volatile fraction of said effluent to said fractionation vessel, third conduit means in communication with a lower region of said separation vessel for removing a residual fraction of said effluent, a first storage vessel, fourth conduit means communicating with an upper region of said fractionation vessel for removing a volatile fraction consisting essentially of the hydrocarbon reject fraction, fifth conduit means communicating between a lower region of said fractionation vessel and said first storage vessel when said effluent contains said polar organic compound for passing said solvent to storage in said first storage vessel, a second storage vessel, and sixth conduit means communicating between a lower region of said fractionation vessel and said second storage vessel when said effluent is substantially free of said polar organic compound for passing said solovent to storage in said second storage vessel.

2. Apparatus for separating solvent and solid polymers from a polymerization effluent produced in a rubber polymerization process comprising polymer solids, solvent, a hydrocarbon reject fraction, and at times a polar organic compound, comprising a separation vessel, first conduit means in communication with an intermediate region of said vessel for supplying said polymerization effluent thereto, a fractionation vessel, second conduit means communicating between an upper region of said separation vessel and an intermediate region of said fractionation vessel for feeding a volatile fraction of said effluent to said fractionation vessel, third conduit means in communication with a lower region of said separation vessel for removing a residual fraction of said effluent, a first storage vessel, fourth conduit means communicating with an upper region of said fractionation vessel for removing a volatile fraction consisting essentially of the hydrocarbon reject fraction, fifth conduit means communicating between a lower region of said fractionation vessel and said first storage vessel when said effluent contains said polar organic compound for passing said solvent to storage in said first storage vessel, a second storage vessel, sixth conduit means communicating between a lower region of said fractionation vessel and said second storage vessel when said effluent is substantially free of said polar organic compound for passing said solvent to storage in said second storage vessel, a stripping vessel, said third conduit means communicating between said separation vessel and said stripping vessel to supply said residual fraction of said effluent to said stripping vessel, seventh conduit means communicating with a lower region of said stripping vessel for removing rubber polymer solids and water, eighth conduit means communicating with an upper region of said stripping vessel for supplying water thereto, ninth conduit means communicating with the bottom of said stripping vessel for supplying stripping fluid thereto, a third storage vessel, tenth conduit means communicating between said stripping vessel and said third storage vessel when said effluent contains said polar organic compound for passing said solvent to storage in said third storage vessel, a fourth storage vessel, and eleventh conduit means communicating between said stripping vessel and said fourth storage vessel when said effluent is substantially free of said polar organic compound for passing said solvent to storage in said fourth storage vessel.

3. Apparatus for separating solvent and solid polymers from a polymerization effluent produced in a rubber polymerization process comprising polymer solids, solvent, a hydrocarbon reject fraction, and at times a polar compound, comprising a separation vessel, first conduit means in communication with an intermediate region of said separation vessel for supplying said polymerization effluent thereto, a fractionation vessel, second conduit means communicating between an upper region of said separation vessel and an intermediate region of said fractionation vessel for feeding a volatile fraction of said effluent to said fractionation vessel, third conduit means in communication with a lower region of said separation vessel for removing a residual fraction of said effluent, a first storage vessel, fourth conduit means communicating with an upper region of said fractionation vessel for removing a volatile fraction consisting essentially of the hydrocarbon reject fraction, a fifth conduit means communicating between a lower region of said fractionation vessel and said first storage vessel when said effluent contains said polar organic compound for passing said solvent to storage in said first storage vessel, a second storage vessel, sixth conduit mean communicating between a lower region of said fractionation vessel and said second storage vessel when said effluent is substantially free of said polar organic compound for passing said solvent to storage in said second storage vessel, a stripping vessel, said third conduit means communicating between said separation vessel and said stripping vessel to supply said residual fraction of said effluent to said stripping vessel, seventh conduit means communicating with a lower region of said stripping vessel for removing rubber polymer solids and water, eighth conduit means communicating with an upper region of said stripping vessel for supplying water thereto, ninth conduit means communicating with the bottom of said stripping vessel for supplying stripping fluid thereto, a contact vessel, tenth conduit means communicating between the upper region of said stripping vessel and the lower region of said contact vessel for conveying solvent and when present polar organic compound to said contact vessel, eleventh conduit means communicating with an upper region of said contact vessel for supplying contacting liquid thereto, a drying column, twelfth conduit means in communication between the top of said contact vessel and said drying column for conveying water containing but polar organic compound free solvent to said drying column, thirteenth conduit means in communication with the upper region of said drying column for removing water vapor therefrom, fourteenth conduit means in communication with the lower region of said drying column for removing solvent therefrom, and fifteenth conduit means in communication with the bottom of said contact vessel for removing contacting liquid, and polar organic compound when present, therefrom.

4. The apparatus of claim 3 including means for condensing a fluid flowing through said thirteenth conduit means, and means for recycling a fluid from said condensing means to said contact vessel.

5. The apparatus of claim 4 including first screen means for separating a solid polymer flowing through said ninth conduit means, a cooling vessel, sixteenth conduit means communicating between said first screen means and said cooling vessel to convey solid polymer to said cooling vessel, said fifteenth conduit means communicating with said cooling vessel to convey cooling liquid to said cooling vessel, a second screen means, and seventeenth conduit means communicating between said cooling vessel and said second screen means to convey cooling liquid and solid polymer to said second screen means which separates the same producing a solid polymer product.

References Cited

UNITED STATES PATENTS

| | | | |
|---|---|---|---|
| 2,153,405 | 4/1939 | Andrews et al. | 203—87 X |
| 2,350,584 | 6/1944 | Buell et al. | 203—93 |
| 2,379,110 | 6/1945 | Souders | 203—92 X |
| 2,514,966 | 7/1950 | Pierotti et al. | 203—76 X |
| 2,833,750 | 5/1958 | Vickers | 260—94.7 X |
| 3,056,772 | 10/1962 | Wallace | 260—94.7 X |
| 3,084,149 | 4/1963 | Stevens et al. | 260—94.7 X |
| 3,234,995 | 2/1966 | Van den Berg et al. | 260—94.7 X |

NORMAN YUDKOFF, *Primary Examiner.*

F. E. DRUMMOND, *Assistant Examiner.*